United States Patent [19]
Hatayama et al.

[11] Patent Number: 5,895,538
[45] Date of Patent: Apr. 20, 1999

[54] METHOD OF MANUFACTURING AND USING VIBRATION-DAMPING MATERIAL

[75] Inventors: Tadashi Hatayama, Tokyo; Ichiro Yamagiwa, Kobe; Kenshi Maekawa, Shimonoseki; Kenji Iwai, Tokyo; Toshimitsu Tanaka; Mamoru Taniuchi, both of Kobe; Reiji Sanuki, Shimonoseki; Isamu Ueki, Shimonoseki; Toshihiko Sasaki, Shimonoseki; Akio Sugimoto; Kazuhisa Fujisawa, both of Kobe, all of Japan

[73] Assignee: Kabushiki Kaisha Kobe Seiko Sho, Kobe, Japan

[21] Appl. No.: 08/822,707

[22] Filed: Mar. 21, 1997

Related U.S. Application Data

[62] Division of application No. 08/743,800, Nov. 5, 1996, Pat. No. 5,690,035, which is a continuation of application No. 08/194,321, Feb. 8, 1994, abandoned.

[30] Foreign Application Priority Data

| Feb. 8, 1993 | [JP] | Japan | 5-44640 |
| Aug. 6, 1993 | [JP] | Japan | 5-215039 |
| Sep. 21, 1993 | [JP] | Japan | 5-259027 |
| Sep. 22, 1993 | [JP] | Japan | 5-259386 |
| Dec. 29, 1993 | [JP] | Japan | 5-352533 |

[51] Int. Cl.$^6$ ............................................. B32B 31/00
[52] U.S. Cl. ............. 156/87; 156/209; 156/252; 156/230; 156/244.22; 156/308.2; 181/207; 181/208
[58] Field of Search ................ 181/207, 208; 156/87, 252, 230, 308.2, 309.2, 244.11, 244.22, 299, 423, 209

[56] References Cited

U.S. PATENT DOCUMENTS

| 2,054,531 | 9/1936 | Zand . | |
| 2,819,032 | 1/1958 | Detrie et al. . | |
| 3,058,704 | 10/1962 | Bergstedt . | |
| 3,160,549 | 12/1964 | Caldwell et al. | 181/207 |
| 3,205,972 | 9/1965 | Stricker et al. . | |
| 3,551,270 | 12/1970 | Sharkey | 156/87 |
| 3,645,822 | 2/1972 | Widiger et al. | 156/244.11 |
| 3,761,344 | 9/1973 | Mrozek et al. | 156/230 |
| 3,891,494 | 6/1975 | Hunter | 156/252 |
| 4,089,722 | 5/1978 | Holoubek | 156/230 |
| 4,734,323 | 3/1988 | Sato et al. | 181/208 |
| 4,874,650 | 10/1989 | Kitoh et al. . | |
| 4,878,976 | 11/1989 | Asakura | 156/309.6 |
| 4,951,992 | 8/1990 | Hockney . | |
| 5,094,318 | 3/1992 | Maeda et al. . | |

FOREIGN PATENT DOCUMENTS

| 800213 | 12/1968 | Canada . |
| 241116 | 10/1987 | European Pat. Off. . |
| 0 435 650 | 7/1991 | European Pat. Off. . |
| 910998 | 6/1946 | France . |
| 29 10 755 | 9/1980 | Germany . |
| 3415848 | 10/1985 | Germany . |
| 4124023 | 1/1993 | Germany . |
| 53145 | 3/1988 | Japan . |
| 1011262 | 11/1965 | United Kingdom . |
| 1583982 | 2/1981 | United Kingdom . |

*Primary Examiner*—Jeff H. Aftergut
*Attorney, Agent, or Firm*—Oblon, Spivak, McClelland, Maier & Neustadt, P.C.

[57] ABSTRACT

A truss type extruded aluminum section is formed of a pair of planar plates and ribs, wherein hollow portions are formed within said section by the ribs and the planar plates. Vibration-damping resin is provided on the inner surfaces of hollow portions, and particularly on the inner surface of the planar plate and on a single surface of the inclined rib. With this arrangement, the vibration energy bending the planar plate and the rib is converted into a heat energy. In the case of manufacturing such truss type extruded aluminum vibration-damping section, for making easy the insertion of the vibration-damping resin in the hollow portion, the vibration-damping resin is stuck on a plastic film to form a long planar body. The plastic film serves as a cover or an adhesive. Moreover, in the case of directly inserting the vibration-damping resin sheet, the vibration-damping resin sheet is subjected to embossing on the adhesive-bonding side for allowing air to escape. Additionally, in the case using an age-hardening type aluminum alloy, the adhesive-bonding for the vibration-damping resin by heating is performed along with the heat treatment for age-hardening.

8 Claims, 14 Drawing Sheets

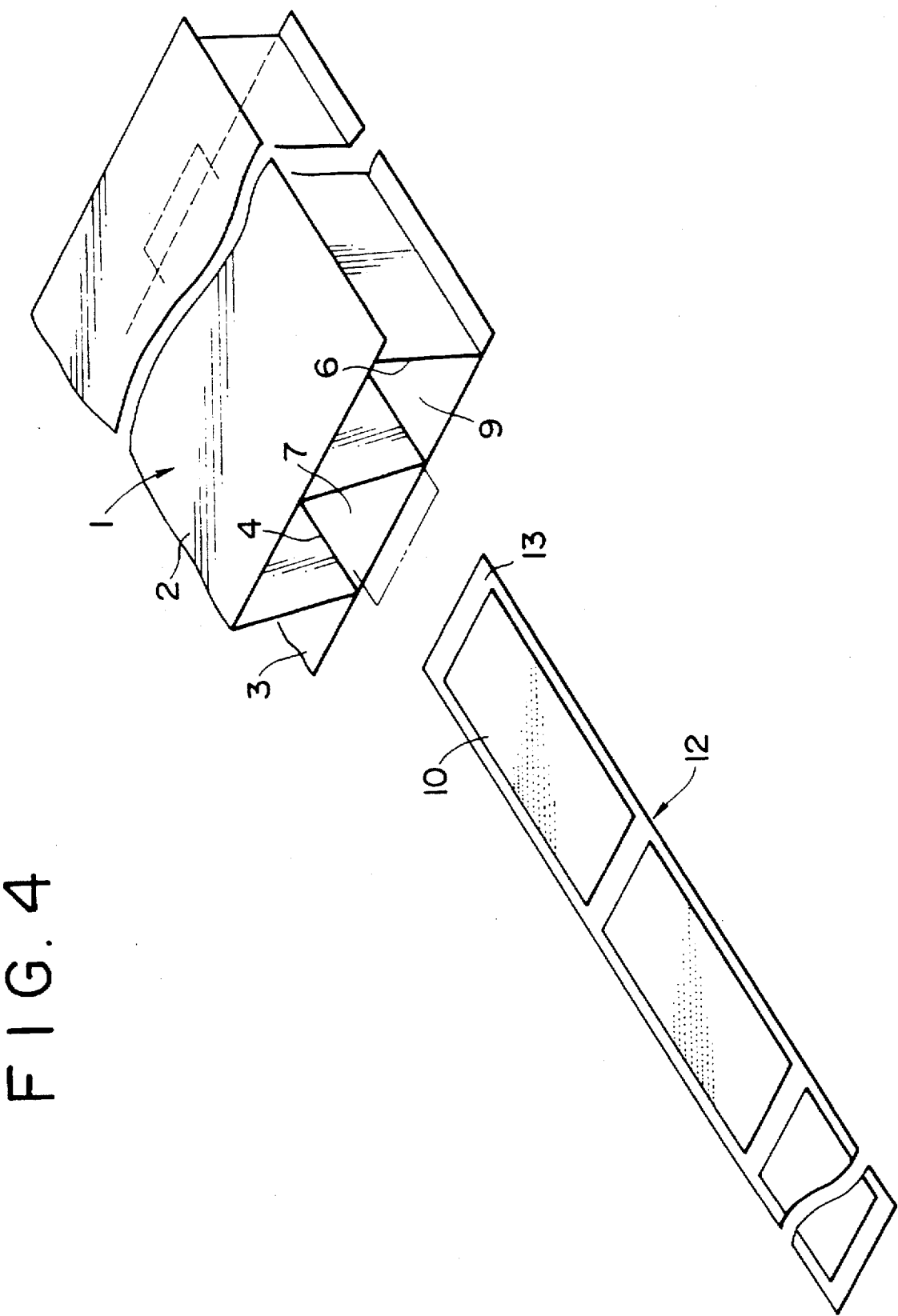

F I G. 8
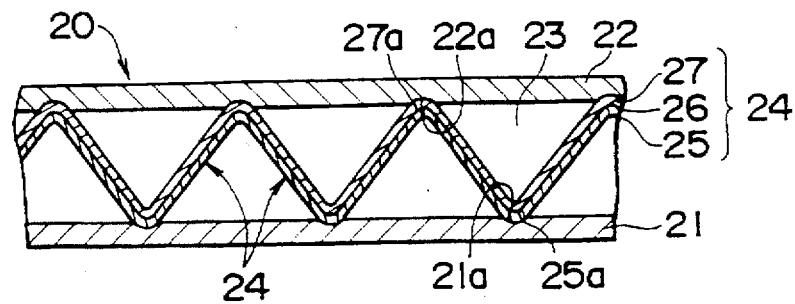
F I G. 9
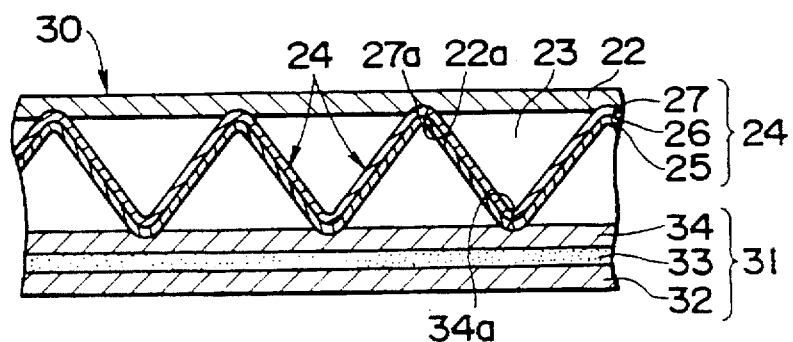
F I G. 10
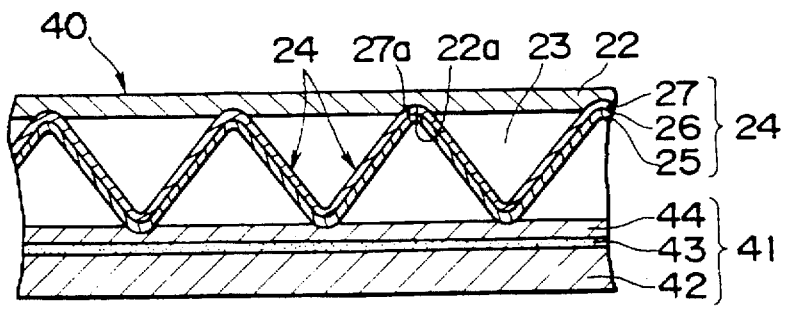

METHOD OF MANUFACTURING AND USING VIBRATION-DAMPING MATERIAL

This is a Division of application Ser. No. 08/743,800 filed on Nov. 5, 1996, now U.S. Pat. No. 5,690,035, which is a continuation of application Ser. No. 08/194,321, filed on Feb. 8, 1994, now abandoned.

BACKGROUND OF THE INVENTION

1. Field of the Invention

The present invention relates to a vibration-damping section used for portions required to be prevented from vibration and noise, which comprises a truss type section formed of a pair of planar plates and ribs wherein hollow portions are internally formed, or a π type section formed of one planar plate and ribs projecting from the planar plate wherein recessed portions are formed on a single surface; to a method of manufacturing the above vibration-damping section; and to a structural member for a transport vehicle using the above vibration-damping section.

2. Description of the Related Art

For example, structural members used for railway vehicles running in high speed such as the Shinkansen require materials having light weight and high rigidity. To meet this requirement, the structural members have been formed of extruded and/or welded aluminum sections. A truss type extruded aluminum section, in which ribs are disposed in zig-zag between two planar plates, is used for a floor surface. On the other handy a π type extruded aluminum section or a π type welded aluminum section, in which ribs project from a single surface of one planar plate, is used for a side wall and roof.

Incidentally, low density aluminum material tends to transmit vibration and noise more than high density iron and like, and therefore vibration and noise must be reduced in consideration of the riding feeling of passengers. As for the truss type extruded aluminum section, to prevent the transmission of rolling noise and motor noise, the present inventors have proposed the adoption of a constrained type vibration-damping structure in which an elastic plate such as an aluminum plate is stuck on the planar plate on a cabin side via resin. Moreover, as for the π type aluminum section, the recessed portions formed by the planar plate and ribs have been buried with glass wool for absorbing sounds.

However, for vehicles running in high speed over 270 km/hr, the truss type extruded aluminum section is disadvantageous in that the vibration energy is attenuated by the portion of the sandwich structure; but the vibration energy passing through the sandwich structure is transmitted by way of the ribs without any suppression. Further, when the vehicle runs with such a high speed, there is generated an aerodynamic noise, which causes a phenomenon of vibrating side walls and a roof at high frequency. The above-described glass wool, which is intended to mainly absorb the sound energy propagating in air, cannot absorb the vibration energy generated on the side walls and the roof. As a result, the vibration energy is transmitted to the cabin by way of the truss type extruded aluminum section or a π type extruded or welded aluminum section and is discharged as the sound energy in air, so that it is impossible to adequately reduce the noise in the cabin.

SUMMARY OF THE INVENTION

Taking the above problems of the prior art into consideration, the present invention has been made, and a first object of the present invention is to provide a vibration-damping section excellent in vibration-damping property, comprising a truss type aluminum section or a π type aluminum section.

A second object of the present invention is to provide a structural member for a transport vehicle using the vibration-damping section excellent in the vibration-damping property.

A third object of the present invention is to provide a method of simply manufacturing the vibration-damping section excellent in the vibration-damping property.

The present invention concerns a vibrating damping section. It is formed of a pair of planar plates and supporting means connecting the planar plates. Vibration-damping resins are provided between the planar plates. By the sticking of the vibration-damping resins, the vibration energy bending the planar plates and the ribs is converted into heat energy, which achieves the effect of reducing vibration energy.

When the vibration-damping resins are stuck on the inner surfaces of the planar plates of truss type sections on the sound source side, and further the vibration-damping resins are stuck on single surfaces of inclined ribs forming the supporting means, the vibration energy is attenuated at the portion of the planar plates and also attenuated in the transmission through the ribs, which makes it possible to reduce the vibration energy by the multiple effect.

The sticking of the vibration-damping resins is also applicable to inner surfaces of a planar plate of the π type section. Using the above-mentioned vibration-damping sections of the truss type section for a floor plate of a high speed railway vehicle and the π type section for side walls and a roof of the high speed railway vehicle, it is possible to greatly reduce the noise in a cabin.

In particular, in the case that the vibration-damping resins are inserted in hollow portions of the truss type section, they are easily inserted by being stuck on a plastic film, thus forming a continuous body. Further, upon heating for melting the vibration-damping resins, the above plastic film serves as an adhesive or a cover. Moreover, in the case that hot melt type vibration-damping resins are directly inserted into the hollow portions, the surface of the vibration-damping resin sheet is subjected to embossing, to be formed with an irregular pattern with grooves crossed to each other, and the vibration-damping resin sheet is inserted such that the embossing is directed on the adhesive-bonding side. Preferably, through-holes are provided at the crossing points of the grooves in the thickness direction for allowing gas (air, water vapor and etc.) to easily escape, thereby improving the adhesiveness. Additionally, in the case of an age-hardening type aluminum section, the heating for the vibration-damping resins is able to serve as the heat treatment for age-hardening, which achieves energy-saving and avoids the overlapping of the heating processes.

BRIEF DESCRIPTION OF THE DRAWINGS

FIG. 4 is a perspective view showing a method of manufacturing the truss type vibration-damping section shown in FIG. 3;

FIGS. 8 to 12 are partial sectional views showing methods of manufacturing additional preferred truss type vibration-damping sections;

DETAILED DESCRIPTION OF THE PREFERRED EMBODIMENTS

Figure 1:
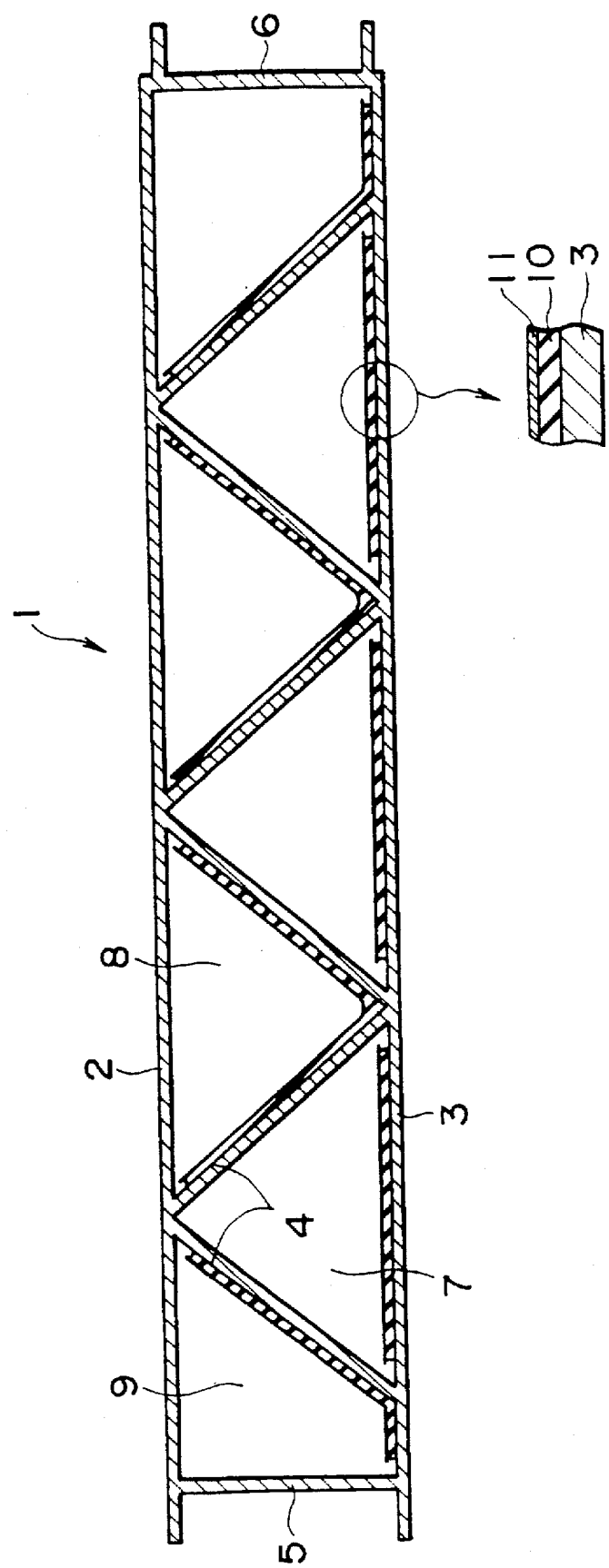
FIG. 1 is a sectional view of a preferred truss type vibration-damping section of the present invention.

The present invention will be described in detail with reference to the accompanying drawings. FIG. 1 is a sectional view of a vibration-damping material composed of a truss type extruded aluminum section. A long-sized extruded aluminum section 1 has a truss type sectional shape, in which upper and lower planar plates 2 and 3 are supported by inclined ribs 4 arranged in zig-zag and perpendicular ribs 5 and 6 at both the ends, to form triangular hollow portions 7, inverse triangular hollow portions 8, and trapezoidal hollow portions 9 at both the ends.

Vibration-damping resins 10 and plastic films 11 are stuck on the lower surface of each hollow portion 7, on the inclined surface of each hollow portion 8, and on the inclined surface and the lower surface of each hollow portion 9. In the example shown in the figure, the lower planar plate 3 is taken as the sound source side, and the vibration-damping resins 10 and the plastic films 11 are stuck on the surfaces where they can be placed by their deadweight, for example, on the upper inner surface of the planar plate 3, the upper inner surface of the inclined rib 4 and the like. Namely, a flat type is placed for the hollow portion 7; a V-shaped type is placed for the hollow portion 8; and a bent-at-valley type is placed for the hollow portion 9. In this case, the vibration-damping resin 10 is melted by heating and is stuck on the inner surface of each hollow portion.

The thickness and the material of the vibration-damping resin 10 is suitably selected according to the required vibration-damping property. The thickness is suitably selected usually in the range from 1 to 10 mm. As the material a resin modified asphalt or special synthetic butyl rubber or the like, which is excellent in the vibration-absorption property, is used. The vibration-damping resin 10 is not limited to a type being self-melted by heating, and may include a type being stuck on the inner surface of the hollow portion by use of adhesive. Moreover, the vibration-damping resin 10 is not limited to a structure formed of a homogeneous material as a whole, and may include a laminated structure, for example a double layer structure in which the outer surface side is composed of a rigid material and the inner surface side is composed of a soft material capable of being self-melted. Additionally, in order to enhance the vibration-damping property and to add other functions, a thin film different in material from the vibration-damping resin 10 such as an aluminum foil, other than the plastic film described later, may be stuck on the whole or partial surface of the vibration-damping resin 10.

The plastic film includes a polyamide film or the like. The plastic film serves as a cover for preventing the vibration-damping resin 10 from being directly exposed and covered on its surface with dust and the like. Accordingly, an aluminum foil may be used in place of the plastic film.

When such a vibration-damping section 1 is applied with vibration from a sound source (lower portion in the figure), the planar plate 3 is excited, and starts to bend and vibrate. The vibration-damping resin 10 held between the planar plate 3 and the plastic film 11 receives the bending deformation, and part of the vibration energy is converted into heat energy. The remaining vibration energy is transmitted to each rib 4, and the rib 4 starts to bend and vibrate. The vibration-damping resin 10 held between the rib 4 and the plastic film 11 receives the bending deformation, and part of the vibration energy is converted into heat energy. As a result, the bending vibration of the planar plate 3 on the sound source side and the inclined rib 4 is suppressed, so that the vibration energy of the whole truss structure is largely suppressed. This makes it possible to significantly reduce the vibration energy transmitted to the other planar plate 2 on the opposed side to the sound source (on the static environmental side), and hence to enhance the sound shielding effect of the whole vibration-damping section.

In particular, the vibration-damping resins 10 for the planar plate 3 are provided on the inner surfaces of the hollow portions 8 and 9 which are originally formed, so that the thickness of the section 1 itself is not increased. Accordingly, as compared with a type in which an elastic plate is stuck on the outer side of the planar plate 3 while putting a viscoelastic resin therebetween, the thickness dimension of the whole section is not increased, the increase in weight is small, and the vibration-damping property is added with the effect of damping via the ribs 4.

Figure 2:
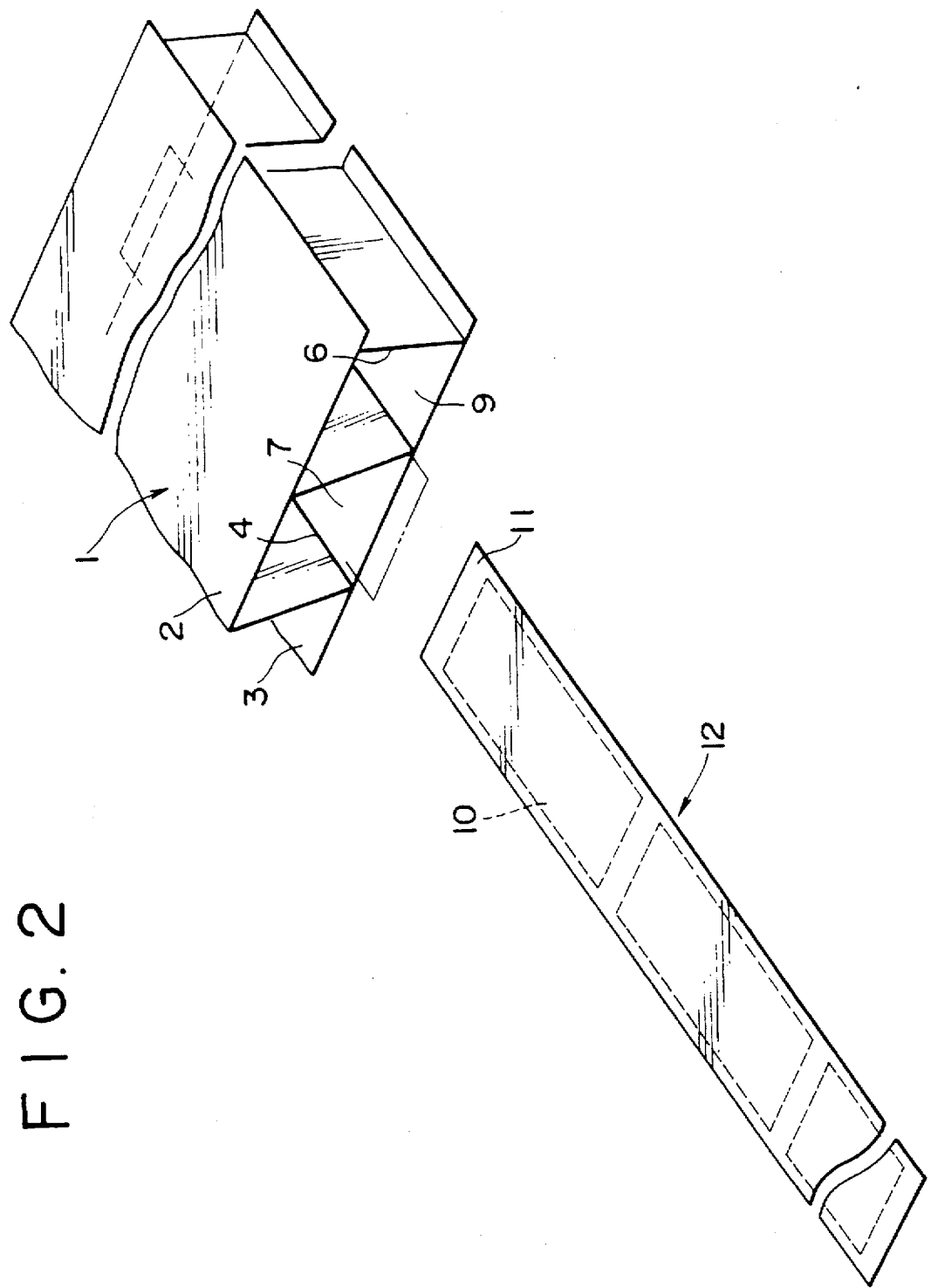
FIG. 2 is a perspective view showing a method of manufacturing the truss type vibration-damping section shown in FIG. 1.

Next, a method of manufacturing the vibration-damping section shown in FIG. 1 will be described with reference to FIG. 2. A plurality of rectangular vibration-damping resin sheets 10 are disposed in series on a plastic film 11 longer than the vibration-damping section 1, and are stuck thereon by use of adhesive, to thus form a continuous body 12. In the vibration-damping resin sheets 10 the width of the rectangular shape is determined according to the widths of each rib 4 and planar plates 2 and 3 to be adhesively bonded thereto; however, the length is suitably selected to be about 1 m. When the length is excessively longer, gaps are generated between the vibration-damping resin sheet 10 and the inner surface of the hollow portion due to warpage which allows the entrapment of air, so that the vibration-damping resin sheet 10 is cut to a length enough to ensure the flat rectangular shape. The continuous body 12 is inserted in each hollow portion 7 while the vibration-damping resins 10 are directed to the lower side. It may be pushed therein while the vibration-damping resins 10 are butted to each other.

However, in the case that the continuous body 12 is difficult to be pushed-in, a string is attached to the leading edge of the plastic film 11. Thus, the string first passes through the hollow portion 7 and is pulled, which makes it possible to pull-in the continuous body 12 through the hollow portion 7. As shown as a two-dot chain line in the figure, in such a state that both the ends of the plastic film 11 are protruded from the end of the hollow portion 7, both the ends of the plastic film 11 are pulled, so that the loosening of the plastic film 11 and the warpage of the middle of the vibration-damping resins 10 are corrected, and the whole continuous body 12 is tightly contacted with the lower inner surface of the hollow portion 7, to thus reduce the entrapment of air. Moreover, as needed, both the ends of the plastic film 11 protruded from the ends of the hollow portion 7 are fixed by a tape or the like in such a state as to be stretched, thus making it possible to exert a tension to the plastic film 11.

Similarly, a continuous body bent in a V-shape is inserted in a space on the lower side of the inclined rib 4, to be tightly contacted therewith. Subsequently, the whole section 1 inserted with the continuous body 12 is inserted in a heating furnace to be heated. The vibration-damping resin 10 is melted by heating, and is bonded on both the inner surface of the hollow portion and a high molecular film 11.

Figure 3:
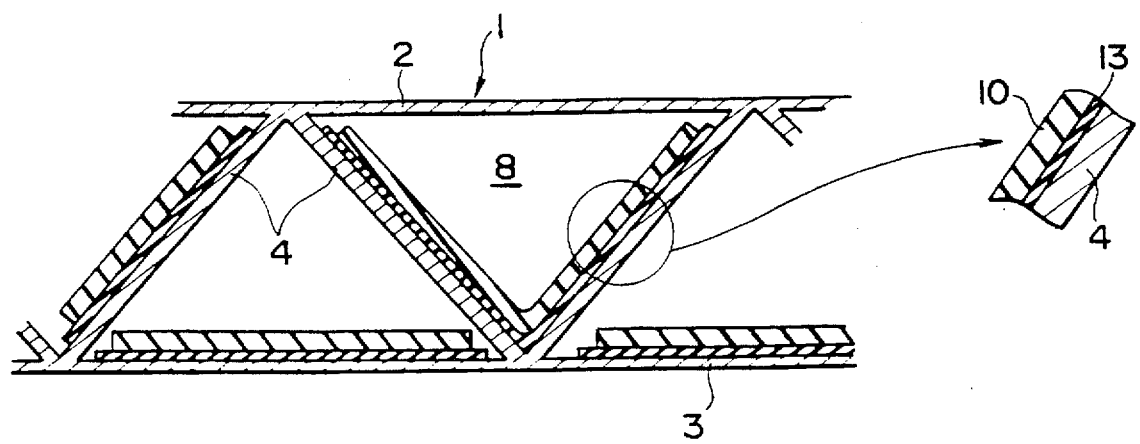
FIG. 3 is a partial sectional view of another preferred truss type vibration-damping section of the present invention.

FIG. 3 is a sectional view of another vibration-damping section. The vibration-damping section is different from the type shown in FIG. 1 in that each vibration-damping resin 10 is stuck on the inner surface of a hollow portion 8 through an adhesive layer 13 of a plastic film. Namely, the outer surface of the vibration-damping resin 10 is not covered as shown in FIG. 1, and is exposed.

A hot-melt type plastic film such as a polyester film or a polyamide film is used as the adhesive layer 13. Further, in place of the film 13, there may be used a net such as a nylon net, a polyethylene net or a cheese cloth. Briefly, there may be used any material having a flexibility and an area enough to adhesively bond the vibration-damping resin with the inner surface of the hollow portion. In particular, the hot-melt type plastic film is excellent in adhesiveness, melting ability and slip property which makes easy the insertion of the vibration-damping resin 10 into the hollow portion 8 before heating, and is melted to act as an adhesive after heating, thus indirectly adhesively bonding the vibration-damping resin sheet 10.

Next, a method of manufacturing the vibration-damping section 1 shown in FIG. 3 will be described with reference to FIG. 4. Vibration-damping resin sheets 10 are juxtaposed on a plastic film 13 and are adhesively bonded therewith, to thus form a continuous body 12. The continuous body 12 is inserted in a hollow portion 7. The plastic film 13 is smoothly slid along the lower surface of the hollow portion 7, and the vibration-damping resins 10 are sequentially pushed-in. The plastic film 13 and the vibration-damping resins 10 are melted together by heating, and are bonded on the inner surface of the hollow portion of the vibration-damping section 1. Accordingly, the plastic film 13 is, preferably, selected to be melted together with the vibration-damping resins 10 substantially at the same temperature. Moreover, for adhesive-bonding between the vibration-damping resins 10 and the plastic film 13, there is used a rubber adhesive capable of achieving adhesive ability at room temperature.

Figure 5A:
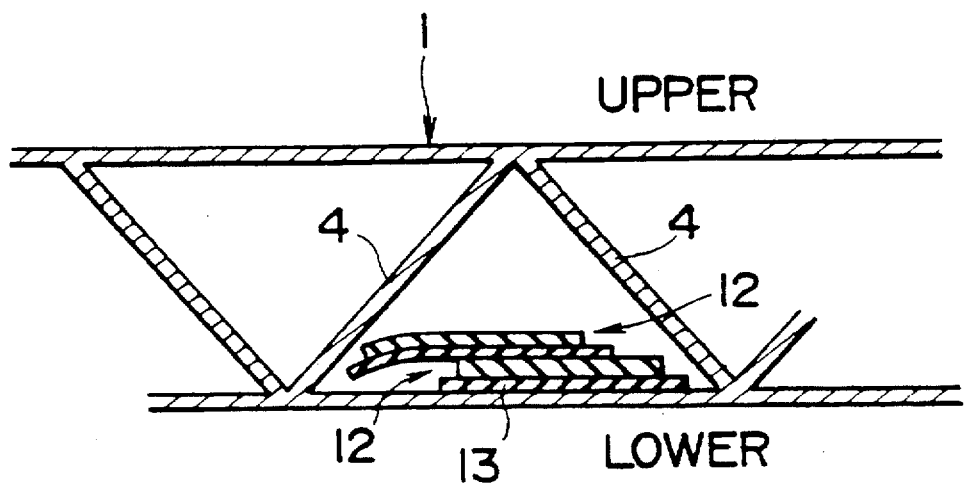
FIGS. 5a and 5b show two stages of another method of manufacturing a truss type vibration-damping section.
Figure 5B:
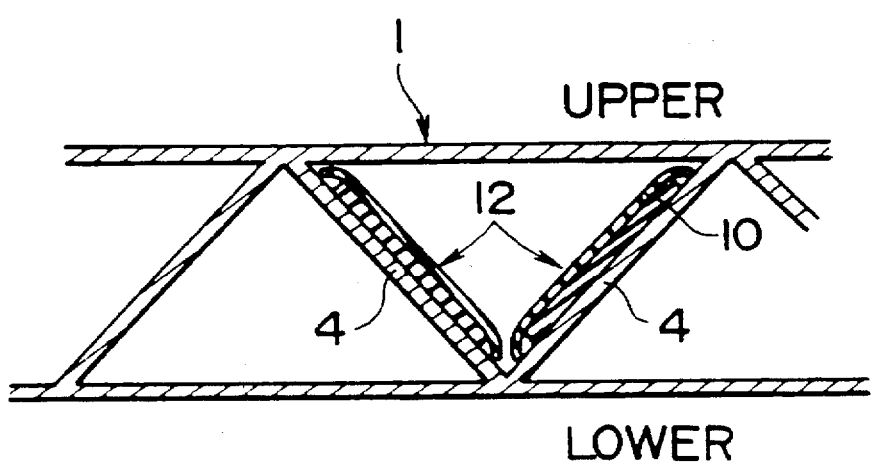

FIGS. 5a and 5b are views showing another insertion method of continuous bodies 12. In FIG. 5a, there is disclosed a method wherein each continuous body 12 is inserted with a plastic film 13 therebelow, and then the section 1 is vertically reversed by use of a reversing machine such that each vibration damping resin 10 is contacted with the inner surface of the hollow portion.

Namely, FIG. 5a shows the state that two of the continuous bodies 12 are inserted so as to be located along ribs 4 and 4. First, the lower continuous body 12 is inserted with the plastic film 13 therebelow, and the upper continuous body 12 is inserted; or the upper and lower continuous bodies 12 and 12 are simultaneously inserted. Subsequently, as shown in FIG. 5b, the section 1 is vertically reversed so that the continuous bodies 12 and 12 are located along the upper inner surfaces of the ribs 4, and are then heated.

Alternatively, a continuous body 12 bent in a V-shape following the shape of the ribs 4 is inserted, and the continuous body 12 is positioned such that the vibration-damping resin 10 is contacted with the inner surface of the hollow portion. As compared with the case that the vibration-damping resin 10 is adhesively bonded with the rib through the plastic film, when the vibration-damping resin 10 is melted and is directly bonded with the inner surface of the rib 4, the air present between the rib 4 and the plastic film does not exist, which makes it possible to prevent the reduction of the adhesive strength between the vibration-damping resin 10 and the inner surface of the rib 4.

Additionally, in the embodiments described above, there is described the case where the plastic film used is a continuous member; however, when a net is instead used, the melted vibration-damping resin is allowed to flow through the mesh of the net, which improves the adhesiveness. Moreover, a continuous body may be formed such that a film or net is held between two of the vibration-damping resin sheets. A continuous body may be also formed such that the ends of the vibration-damping resins are stuck to each other by a tape, or a string or wire is made to pass through the vibration-damping resins.

Figure 6:
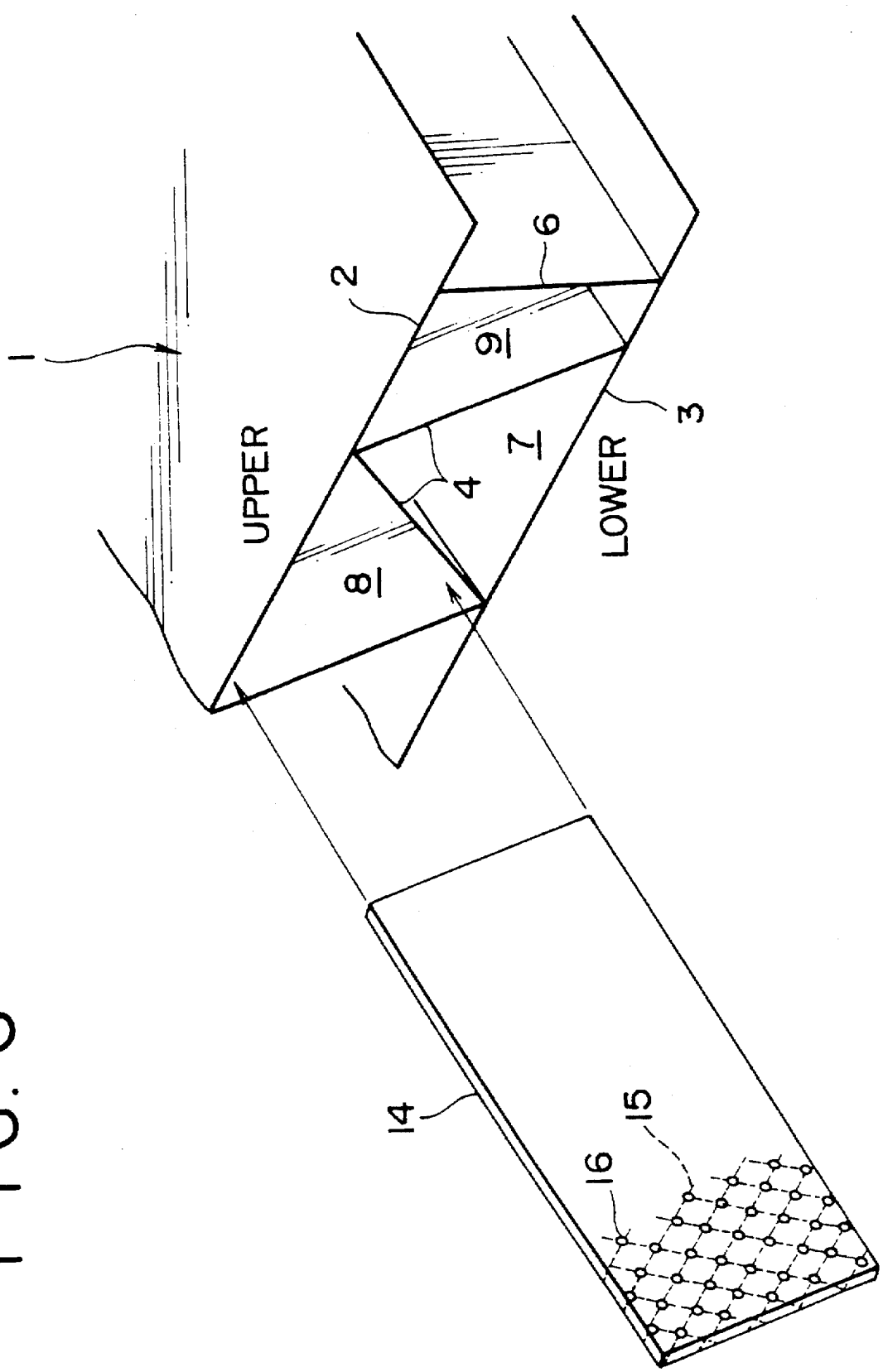
FIGS. 6 and 7 are perspective views showing methods of manufacturing still further preferred truss vibration-damping sections of the present invention.

Further, the case that a hot melt vibration-damping resin sheet 14 is directly inserted in a hollow portion will be described with reference to FIG. 6. A plurality of vibration-damping resin sheets 14 cut in such a rectangular shape as shown in the figure are prepared, and sequentially pushed in each hollow portion. Thus, the vibration-damping resin sheets 14 are inserted on hollows 7, 8 and 9 along the desired inner surfaces, and placed on the inner surfaces of the hollows 7, 8 and 9.

The hot melt vibration-damping resin sheet 14 is obtained by sheet forming of a resin modified asphalt or special synthetic butyl rubber having a thickness of 1 to 10 mm. In addition, the surface of the vibration-damping resin sheet 14 is three-dimensionally formed with an irregular pattern by embossing 15. The vibration-damping resin sheet 14 is inserted into the hollow portion 8 such that the surface subjected to embossing 14 is taken as the adhesive-bonding surface. In the example shown in the figure, the embossing 15 is performed by transferring the irregular roll pattern of V-grooves in a diamond crossing arrangement on the surface of the vibration-damping resin sheet 14. A sheet heated and softened is subjected to embossing by use of a cold embossing roll and a rubber roll. The pattern transferred by the embossing is fixed by moving the sheet between cooling rolls. The pattern by the embossing 15 is not limited to V-grooves in a diamond crossing arrangement. It may include such a pattern that the recessed portions of the irregularity on the surface are continued to the outer periphery, for example, it may include a random pattern.

Further, in addition to the embossing 15 on a single surface, through-holes 16 in the thickness direction are provided at crossing points of the grooves. The through-holes 16 are intended to act as the holes to discharge the air confined on the adhesive bonding side upon thermal fusing, each of which preferably has a diameter of 3 mm or more for preventing blocking upon thermal fusing. By use of the embossing roll projectingly provided with pins at the crossing points of the V-shaped vortexes, the throughholes 16 can be perforated together with the embossing.

The vibration-damping resin sheet 14 thus formed is cut into parts with a flat rectangular shape, to be inserted in the hollow portion 8. The vibration-damping resin sheets 14 can be sequentially pushed-in in such a manner as to be butted to each other. Further, the vibration-damping resin sheets 14 are connected to each other by means of strings or the like, and which can be pulled in the hollow portion 8 via the strings. Moreover, the vibration-damping resin sheet 14 having substantially the same length as a section may be used, which can be pulled from one end of the section. Additionally, the vibration-damping resin sheets 14 are similarly inserted on the inner surface of the planar plate 3.

Figure 7:
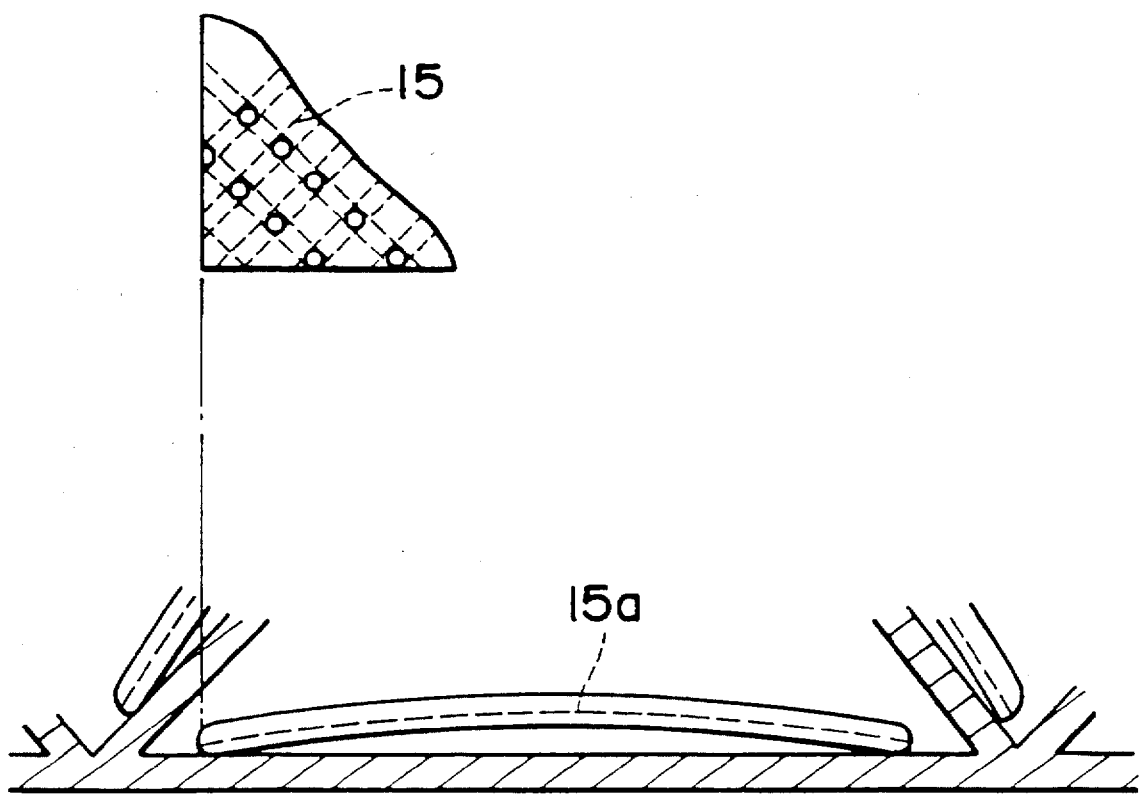

Next, the whole aluminum section 1, in which the vibration-damping resin sheets 14 are inserted is inserted in a heating furnace and is heated. The aluminum section made from an age-hardening type aluminum alloy is required to be heated for age-hardening during manufacturing process. For example, in the case of A6061 alloy, the aluminum section is heated at 190° C. for 3 hours. The vibration-damping resin sheet 10 made from a resin modified asphalt, special synthetic butyl rubber or the like is hot melted at (130–150° C.) for (20–30 min). At the high temperature heating of 190° C., the vibration-damping resin sheet is liable to be first warped as shown in FIG. 7 and is only then started to be rapidly melted. However, since air escapes to the inside of the section through the grooves 15a of the embossing 15, the amount of the confined air is reduced, to thereby improve the adhesiveness on the adhesive-bonding surface. Further, when the through-holes 16 at the crossing points of the grooves 15a are provided, the discharge of air can be certainly performed, resulting in ensured adhesiveness in the whole surface.

In addition, as the method of improving the adhesiveness between the aluminum section 1 and the vibration-damping resin sheet 14, there was previously described the method of using the plastic film or the polyethylene net. However, in the case of using the vibration-damping resin sheet 14 having the width dimension being substantially similar to that of the aluminum section 1 in place of the plastic film, the rubber adhesive may be coated on the hot melted surface side of the vibration-damping resin sheet 14, and is tightly contacted with the inner surface of the hollow portion of the aluminum section 1 together with the vibration-damping resin sheet 14.

Thus, using the heating both as age-hardening and as hot melting for the vibration-damping resin sheet described above, the hot melting process for the vibration-damping resin sheet can be incorporated in a series of manufacturing processes for the age-hardening type aluminum alloy. Such an age-hardening type aluminum alloy is represented by an Al—Mg—Si based aluminum alloy (6000 series) which contains each of Mg and Si in an amount of 0.5 to 1.0 wt % and is age-hardened by the precipitation of an intermetallic compound of $Mg_2Si$. Further, an Al—Zn system, Al—Zn—Mg system, Al—Zn—Mg—Mn system and the like can be used. For example, in the case of A6061 alloy, the heating for the age-hardening is performed at 170–190° C.

Further, in the embodiments described above, there is described the case that the extruded aluminum section is used; however, the present invention may be applied to a section of a type in which upper and lower planar plates are integrated with ribs by welding or adhesive-bonding. Additionally, the portions where the vibration-damping resins are stuck are not limited to those shown in FIGS. 1 and 3. For example the vibration-damping resins may be stuck only on a single surface of the inclined rib 4; only on the inner surface of the planar plate 3 on the sound source side; on the inner surface of the planar plate 2 on the static sound side in place of the inner surface of the planar plate 3 on the sound source side; on both the inner surfaces of the planar plates 2 and 3 on both the sound source side and the static sound side; and on both the sides of the inclined rib 4. In place of the inner side of the planar plates 2 and/or 3, of course, the vibration-damping resin sheet and/or plastic film can be applied to the outer surfaces of the planar plates of the section. Moreover, a constrained type sandwich structure in which elastic plates holding a viscoelastic resin therebetween is stuck may be added on the outer surfaces of the planar plate 2 and/or 3.

Next, a vibration-damping section equivalent to the case using the vibration-damping resin sheet will be described with reference to FIGS. 8 to 12.

In FIG. 8, a vibration-damping section 20 is so constructed as follows; namely, a continuously folded plate-like rib is formed of a vibration-damping rib 24 composed of aluminum members 25 and 27 integrally formed with a resin 26 held therebetween; an aluminum plate 22 having each vertical groove 22a on a single surface and an aluminum plate 21 having each vertical groove 21a on a single surface are disposed such that the surfaces having these vertical grooves 21a and 22a are opposed to each other; and the vortex portion 27a of each crest of the sandwich vibration-damping plate 24 is inserted in the vertical groove 22a of the aluminum plate 22, and the valley portion 25a of each crest is inserted in the vertical groove 21a of the aluminum plate 21 on the sound source side, and which are adhesively bonded to each other.

When the vibration-damping section 20 is applied with vibration from the sound source (lower portion in the figure), the aluminum plate 21 is excited and is started to be bent and vibrate, and the energy is transmitted to the vibration-damping rib 24. At this time, when the vibration-damping rib 24 receives the bending deformation, the resin 26 constituting the intermediate layer of the rib 24 also receives the shearing deformation, so that the vibration energy is effectively converted into heat energy and is discharged to space 23. As a result, the bending vibration of the whole vibration-damping rib 24 is suppressed, which makes smaller the vibration energy transmitted to the aluminum plate 22 on the static environmental side, and can enhance the sound shielding effect of the whole panel.

A vibration-damping section shown in FIG. 9 is constructed as follows: namely, a sandwich vibration-damping plate 31, in which a resin 33 is held between two aluminum members 32 and 34 and is integrally formed therewith, is attached in place of the lower aluminum plate 21 of the vibration-damping section 20 shown in FIG. 8. Further, the upper aluminum plate 22 may be replaced by the sandwich vibration-damping plate. Accordingly, in the vibration-damping section 30, when the aluminum plate 32 is excited and starts to bend and vibrate, the bending vibration energy is attenuated somewhat for a time when it passes through the resin 33, and thereafter is transmitted to the rib 24. This makes it possible to further improve the sound shielding performance obtained by the vibration-damping section 20 shown in FIG. 8.

Further, as shown in FIG. 10, there may be freely adopted a sandwich vibration-damping plate 41 in which a thick aluminum plate 42, a resin layer 43 and a thin aluminum plate 44 are integrally formed in this order along he thickness direction from the sound source side (lower portion of the figure). With this construction, the bending rigidity of the thick aluminum plate 41 can be close to the bending rigidity of a truss structure composed of the thin aluminum plate 44, sandwich vibration-damping plate 24 and aluminum plate 22. As a result, the resin 43 can be positioned to be close to the neutral axis of the whole sound preventive panel 40, which makes it possible to increase the absorbed strain energy. Moreover, similarly to the sandwich vibration-damping plate 41, the upper aluminum plate 22 may be replaced by a vibration-damping plate in which the resin can be close to the neutral axis.

As compared with the case that the resin layer is positioned to be relatively apart from the neutral axis of the whole panel, just as the vibration-damping section 30 using the so-called equal thickness type aluminum vibration-damping plates in which the resin is held between the aluminum plates having the same thickness, the shearing strain energy generated in the resin when the whole panel is applied with vibration becomes very large, which enlarges the ratio with which the vibration energy is converted into heat energy, and hence to further enhance the sound shielding effect of the whole panel.

Figure 11:
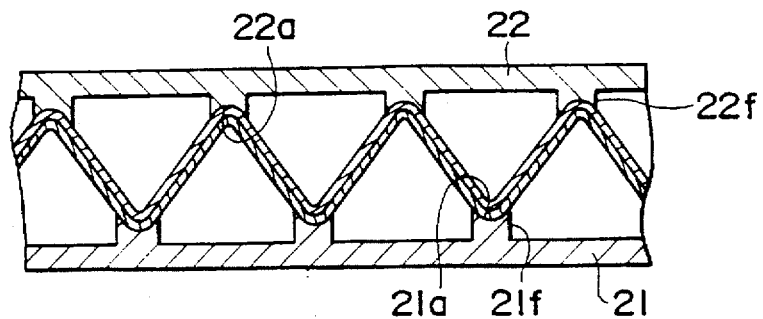
Figure 12:
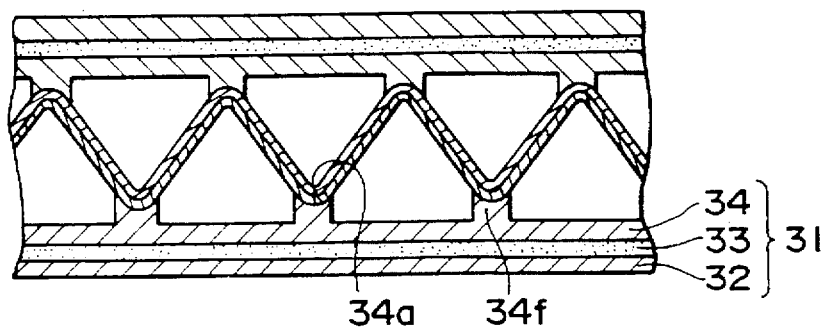

FIG. 11 shows a modification of FIG. 8, wherein vertical grooves 21a and 22a are provided on projecting streaks 21f and 22f for preventing the reduction of the partial rigidities of aluminum plates 21 and 22. Similarly, FIG. 12 is a modification of FIG. 9, wherein vertical grooves 34a are provided on projecting streaks 34f for preventing the reduction of the partial rigidity of an aluminum plate 34 in a sandwich vibration-damping plate 31.

The above description concerns the truss type vibration-damping section, and there will be described an embodiment of a $\pi$ type vibration-damping section according to the present invention with reference to FIG. 13.

Figure 13:
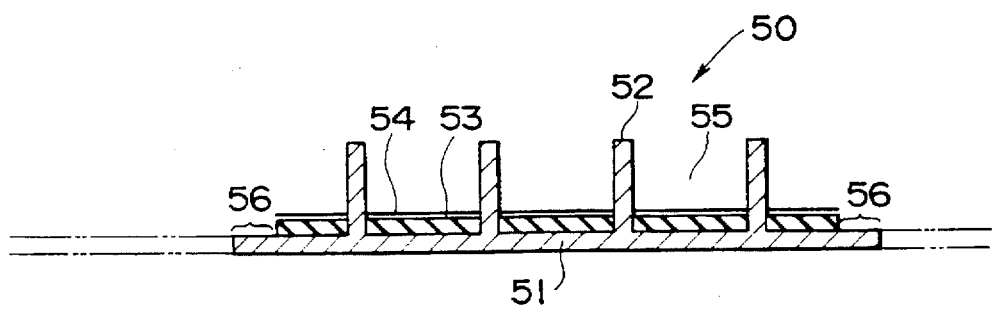
FIG. 13 is a sectional view of a π type vibration-damping section of the present invention.

In FIG. 13, a vibration-damping section 50 of this embodiment is composed of a slender planar plate 51 extending from this side to the other side on the paper, and four projecting ribs 52 projectingly provided on a single surface of the planar plate 51 in the longitudinal direction, and has a sectional shape in which recessed spaces 55 are formed in the projecting ribs 52 and the planar plate 51. A vibration-damping resin 53 and a plastic film 54 are stuck on the lower side of each recessed portion 55 and on the upper single surface of the planar plate 51. Thus, the vibration-damping section 50 has a $\pi$ shaped section. A plurality of units of the $\pi$ shaped sections are connected to each other in the right and left on the paper, to constitute surfaces of a floor, side wall and roof. In addition, since both the end portions of the planar plate 51 are taken as the connected portions, the periphery 56 of each connected portion is not stuck with the vibration-damping resin 53, which avoids obstruction of the connection with the adjacent sectional member by welding.

A method of manufacturing the vibration-damping section 50 will be described below. First, aluminum is extruded or welded such that the planar plate 51 and the ribs 52 form a section having a $\pi$ shape as a unit, or an aluminum section is manufactured by welding. Next, in the section as it is, or in a plurality of sections welded to each other, the vibration-damping resin 53 adhesively bonded with a plastic film from the upper side is inserted in the recessed portion 55, and is heat-treated at 150° C. to 250° C. for age-hardening. Finally, it is cooled. Since a material whose melting temperature is lower than the age-hardening temperature is selected as the vibration-damping resin 53, the vibration-damping resin 53 is hot melted and bonded on the planar plate 51. Moreover, only the vibration-damping resin 53 may be inserted in the recessed portion 55 without the plastic film 54. In addition, the vibration-damping resin may be adhesively bonded on a single surface or both surfaces of the rib 53. In order to increase the adhesiveness between aluminum planar plate 51 and the vibration-damping resin, the adhesives may be inserted between them, as shown in FIG. 3.

Figure 14:
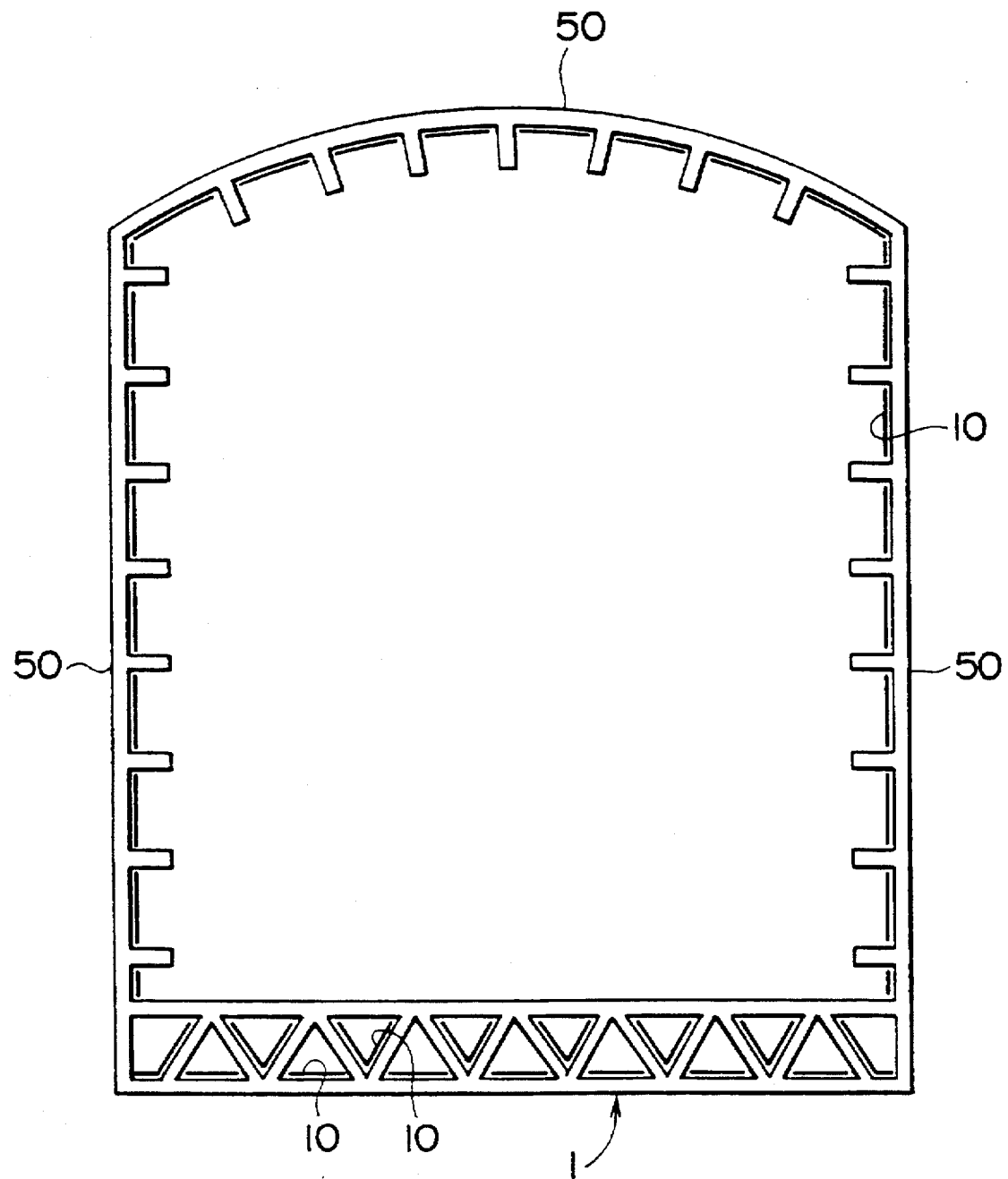
FIG. 14 is a sectional view of a structural member for a high speed railway vehicle using the truss type vibration-damping section and the π type vibration-damping section of the present invention.

The application of the vibration-damping section 50 thus manufactured and the vibration-damping section 1 shown in FIG. 1 will be described with reference to FIG. 14. FIG. 14 is a sectional view of a structural member for a railway vehicle, wherein the truss type vibration damping sections 1 shown in FIG. 1 are connected to each other and are used for a floor surface; and the $\pi$ type vibration-damping sections 50 are connected to each other and are used for side walls and a roof. In the vibration-damping section 1, the vibrations such as motor noise and rolling noise generated from the lower surface side of the floor are absorbed by bending deformation of the vibration-damping resin 10. As a result, the transmission of the vibrations such as the motor noise and rolling noise into a structure for a transport vehicle can be attenuated. Further, when the $\pi$ type vibration-damping sections are used for the roof or the side walls, high frequency vibration due to the aerodynamic noise during high speed running and high frequency vibration contained in the rolling noise and the motor noise are absorbed by the bending deformation of the vibration-damping resin 10. As a result, the transmission of the high frequency vibration into the structure can also be attenuated. Consequently, there can be provided a railway vehicle excellent in the riding quality without giving the discomfort to the passengers. Such a structural member for a transport vehicle is applicable for an airplane, automobile and high speed vessel other than a high speed railway vehicle.

Figure 15:
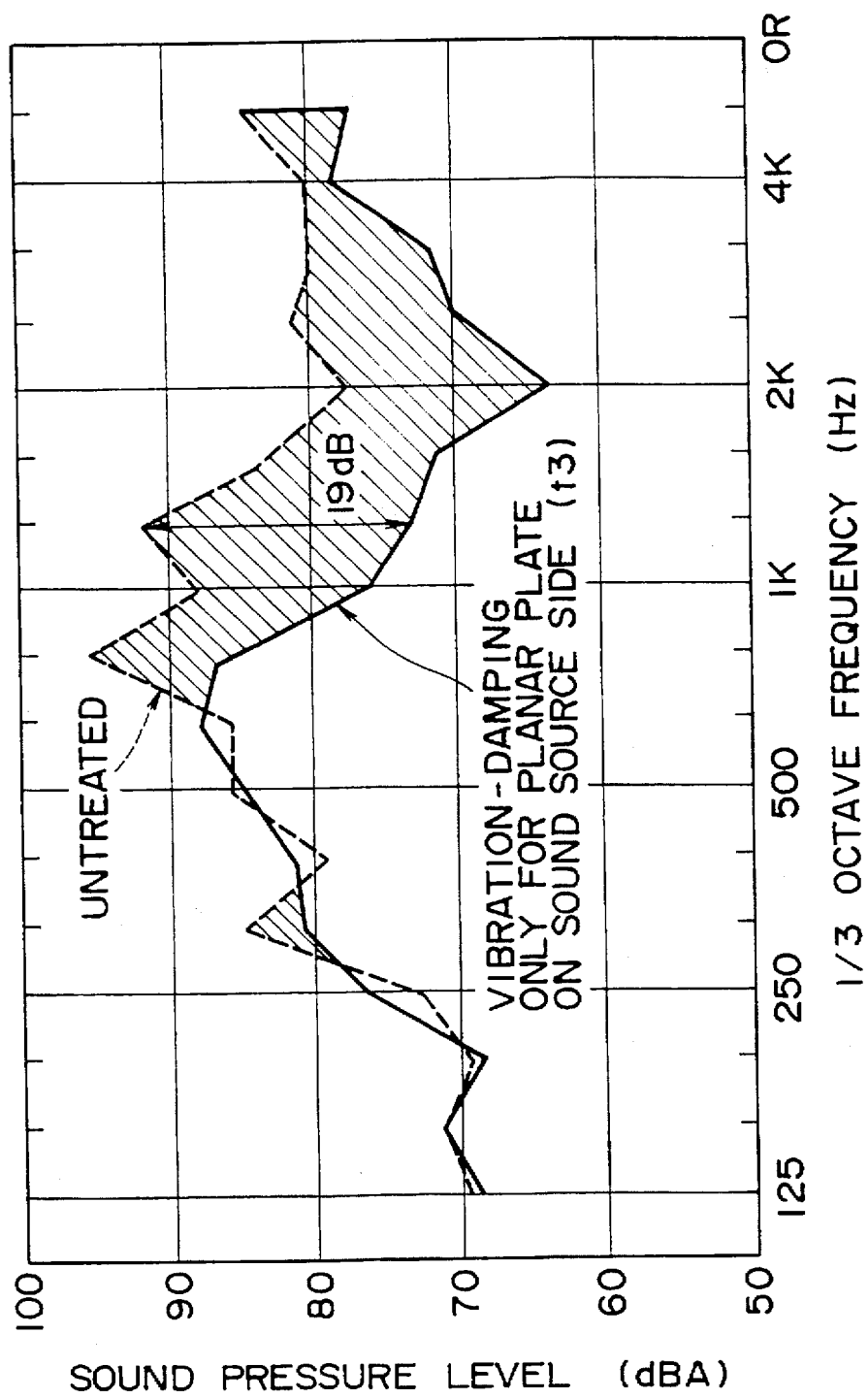
FIGS. 15 to 17 are graphs showing the vibration-damping property of the truss type vibration-damping sections of the present invention.
Figure 16:
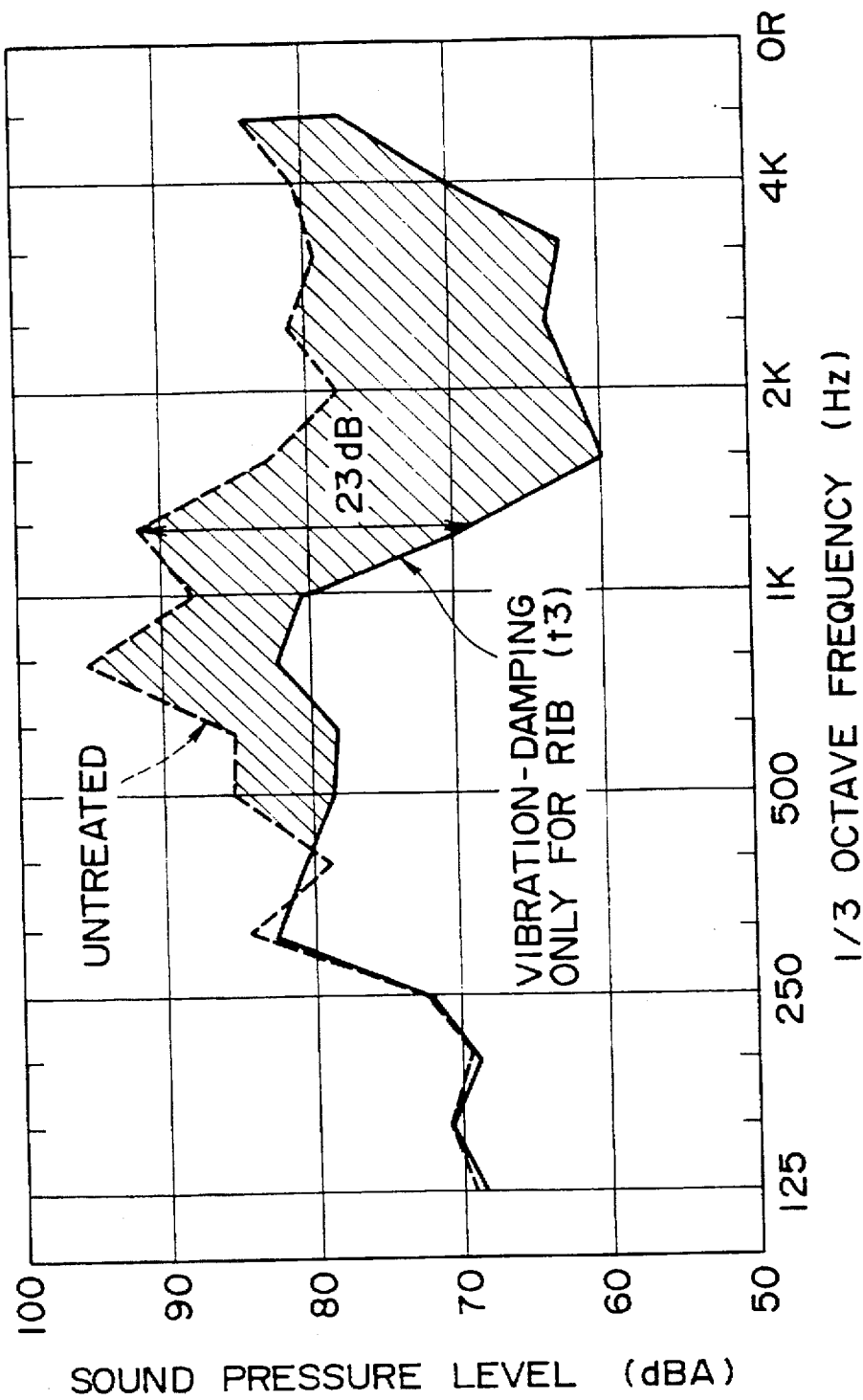
Figure 17:
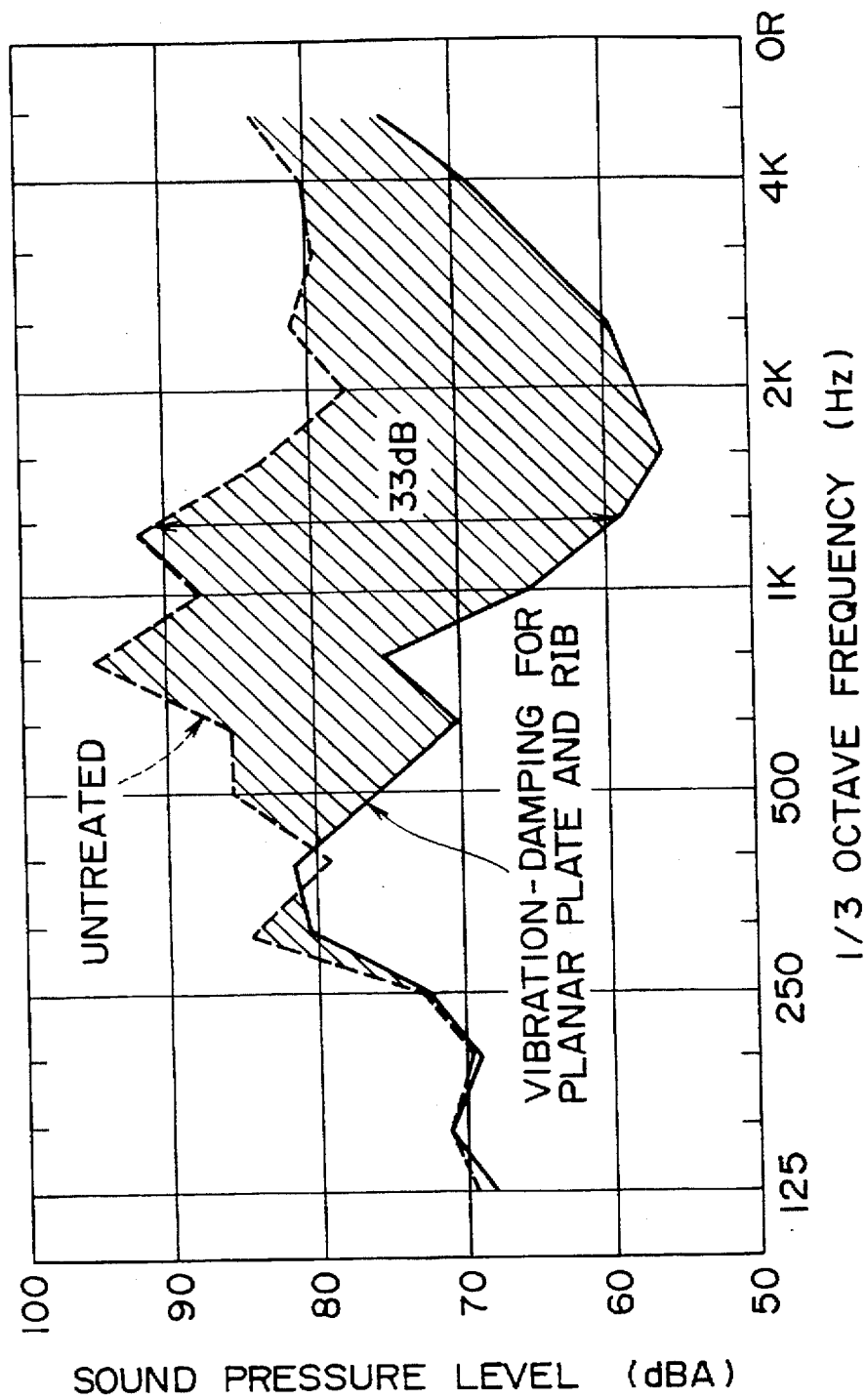

The vibration-damping property of the above-described vibration-damping section will be further described with reference to FIGS. 15 to 17. For an aluminum section formed in a shape shown in FIG. 1 by extrusion of A6061 alloy, vibration-damping resin sheets, which are made from a resin modified asphalt (thickness: 3 mm, melting temperature: 140° C.) sold by Nippon Tokushu Toryo Co., LTD and are subjected to embossing to be formed with V-grooves having a depth of 1.0 mm crossed to each other, are inserted in necessary locations. The aluminum section is then heat-treated at 190° C. for 3 hours for age-hardening, and at the same time the vibration-damping resins are hot melted and bonded to the aluminum section. In the sample of FIG. 15, the vibration-damping resins are hot melted and bonded only on the inner surface of the planar plate 3 of FIG. 1. In the sample of FIG. 16, the vibration-damping resins are hot melted and bonded only on single surfaces of the inclined ribs of FIG. 1. In the sample of FIG. 17, the vibration-damping resins are hot melted and bonded on the inner surface side of the planar plate 3 and on the single surfaces of the inclined ribs 4, as shown in FIG. 1. In FIGS. 15 to 17, an untreated section where the vibration-damping resin is not hot melted and bonded at all is shown to clarify the effect of damping for each case. The results of measurement of the sound transmission loss with respect to ⅓ octave frequency for each case of sections are plotted together with those of the untreated section.

In FIG. 15, it was revealed that the sample where the vibration-damping resins are hot melted and bonded only on the planar plate on the sound source side achieves the effect of reducing the sound energy by 19 dB maximum as compared with the untreated sample. The reduction effect is comparative to the sandwich structure where an elastic plate is stuck on the lower side of the planar plate via a viscoelastic resin. Namely, it is possible to achieve the equivalent reduction effect without provision of the elastic plate on the lower side of the planar plate and without increasing the thickness and weight of the section.

In FIG. 16, it was revealed that the sample where the vibration-damping resins are hot melted and bonded only on single surfaces of the ribs achieves the effect of reducing the sound energy by 23 dB maximum as compared with the untreated section. Further, although FIG. 15 does not show the damping effect in the low frequency region until 630 Hz., there was recognized in this case the effect of reducing the sound energy by 6 dB until 500 Hz. This means that the rolling noise and motor noise are difficult to be further transmitted in the high speed vehicle.

In FIG. 17, it was revealed that the sample where the vibration-damping resins are hot melted and bonded on the inner surface of the planar plate 3 and on the single surfaces of the ribs 4 as shown in FIG. 1 achieves the effect of reducing the sound energy by 33 dB maximum as compared with the untreated section via the multiple effect. In particular, the hot melting and bonding of the vibration-damping resins on the single surfaces of the ribs contribute to the excellent vibration-damping effect.

Figure 18:
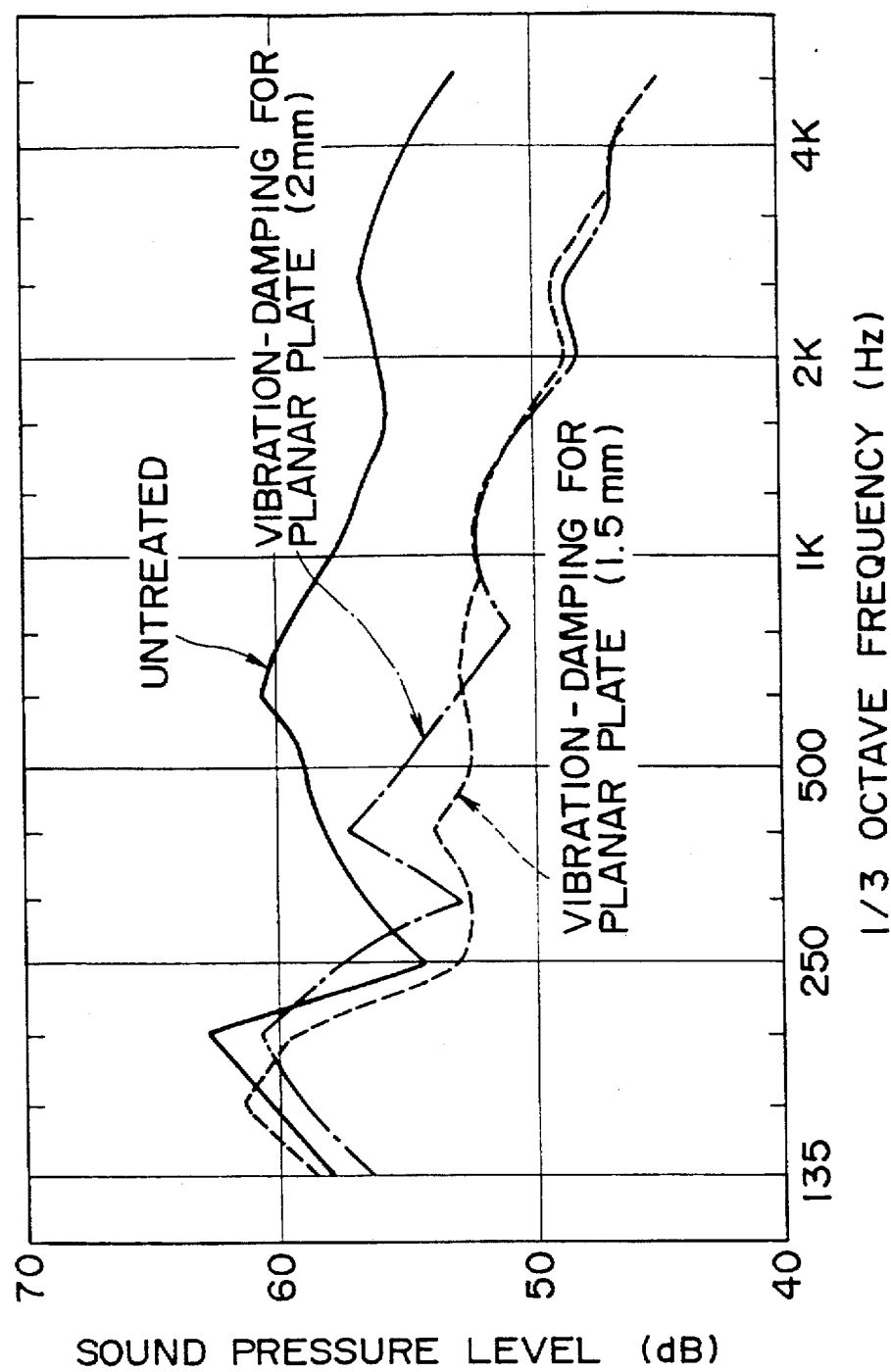
FIG. 18 is a graph showing the vibration-damping property of the π type vibration-damping property.

Next, the vibration-damping characteristic of the vibration-damping section 50 shown in FIG. 13 will be described with reference to FIG. 18. The experiments were made by measurement of the sound transmission loss with respect to the ⅓ octave frequency just as shown in FIGS. 15 to 17. The dashed line indicates a sample in which only the inner surface of a planar plate is covered with a vibration-damping resin having a thickness of 2 mm, and the chain line indicates a sample in which only the inner surface of a planar plate is covered with a vibration-damping resin having a thickness of 1.5 mm. For the untreated section, there is shown the experimental result for only an extruded aluminum section under the same condition. It is revealed that the vibration-damping section is apparently effective compared with the conventional material of only the extruded aluminum section within the frequency region being 500 Hz or more, irrespective of the thickness of the vibration-damping resin.

The experiments shown in FIGS. 15 to 17 are performed for the case that the vibration-damping resins absorb the vibration energy by bending deformation. However, in the sample where an aluminum foil is stuck on the surface of each vibration-damping resin, since the vibration-damping resin is held between the rib and the aluminum foil, the sample receives a slight shearing deformation as well as the bending deformation, which sometimes improves the absorption ratio of the sound energy. To examine the influence of the aluminum foil, the following experiments were performed. First, rectangular plates were cut from the planar plate 3 having a thickness of 3 mm in the aluminum section of FIG. 1, and there were prepared the first sample where only the vibration-damping resin having the thickness of 2 mm was stuck on the single surface of the rectangular plate; the second sample where the aluminum foil was further stuck on the above vibration-damping resin; and the third one of only the rectangular plate.

The excitation experiments were performed by supporting the center of each sample, and the magnitude of the attenuation was obtained by the resonance curve thus obtained. Further, the loss factor was calculated on the basis of the third resonance frequency obtained at an environmental temperature of 20° C. In the first sample of only the vibration-damping resin, the third resonance frequency was 823.1 Hz, and the loss factor was 0.0405. On the other hand, in the second sample with the aluminum foil, the third resonance frequency was 876.4 Hz and the loss factor was slightly increased to be 0.0531. Additionally, in the third sample of only the rectangular plate, the third resonance frequency was 786.1 Hz and the loss factor was 0.0012. Accordingly, by sticking of the aluminum foil on the surface of the vibration-damping resin, the loss factor is increased, which gives a possibility that the vibration-damping property is improved by sticking a plate having a rigidity larger than that of the aluminum foil on the surface of the vibration-damping resin or by forming the vibration-damping resin of a material liable to be attenuated by the shearing deformation.

What is claimed as new and desired to be secured by Letters Patent of the United States is:

1. A method of applying vibration damping resin to an object surface, comprising the steps of:

connecting vibration damping resin sheets together to form a continuous body;

attaching a string to a leading edge of said continuous body;

moving said continuous body into position on said object surface by pulling on said string; and bonding said vibration damping resin sheets of said continuous body to said object surface.

2. The method according to claim 1, wherein the step of connecting vibration damping resin sheets together comprises attaching said resin sheets to a plastic film.

3. The method according to claim 2, wherein said moving step comprises positioning said continuous body on said object surface such that a surface of said vibration damping resin sheets opposite said plastic film is contacted with said object surface.

4. The method according to claim 1, 2 or 3, wherein said bonding step comprises heating said resin sheets.

5. The method according to claim 2, wherein said moving step comprises positioning said continuous body on said object surface such that said plastic film is contacted with said object surface.

6. The method according to claim 1, further comprising the step of:

embossing an irregular pattern to the surface of said vibration damping resin sheets to be attached to the object surface.

7. A method of applying vibration damping resin to an object surface, comprising the steps of:

connecting vibration damping resin sheets together to form a continuous body including substeps of arranging each of said resin sheets on a plastic film and attaching each of said resin sheets to said plastic film;

moving said continuous body into position on said object surface; and bonding said vibration damping resin sheets of said continuous body to said object surface, wherein said moving step comprises positioning said continuous body on said object surface such that said plastic film is contacted with said object surface, and wherein said bonding step comprises melting said plastic film.

8. A method of applying vibration damping resin to an object surface, comprising the steps of:

connecting vibration damping resin sheets together to form a continuous body;

moving said continuous body into position on said object surface;

bonding said vibration damping resin sheets of said continuous body to said object surface; and embossing an irregular pattern to the surface of said vibration damping resin sheets to be attached to the object surface, wherein said irregular pattern is a pattern in which grooves cross each other and in which holes are formed through said vibration damping resin sheets at the points where said grooves cross.

* * * * *